(12) United States Patent
Sparks et al.

(10) Patent No.: US 6,256,008 B1
(45) Date of Patent: Jul. 3, 2001

(54) COMPUTER SCREEN SAVER WITH WIRELESS MESSAGING CAPABILITY AND METHOD THEREFOR

(75) Inventors: James Steven Sparks; Jeffrey L. Steinberg, both of Boca Raton, FL (US)

(73) Assignee: Motorola, Schaumburg, IL (US)

( * ) Notice: Subject to any disclaimer, the term of this patent is extended or adjusted under 35 U.S.C. 154(b) by 0 days.

(21) Appl. No.: 08/763,267

(22) Filed: Dec. 10, 1996

(51) Int. Cl.⁷ .................................................. G06F 3/14
(52) U.S. Cl. .................................... 345/117; 345/347
(58) Field of Search .......................... 345/117, 326–358, 345/145–146; 340/825.3–825.44

(56) References Cited

U.S. PATENT DOCUMENTS

| | | | |
|---|---|---|---|
| 5,498,003 | * 3/1996 | Gechter | 345/117 X |
| 5,642,185 | * 6/1997 | Altrieth, III et al. | 345/212 X |
| 5,678,034 | * 10/1997 | Chew | 345/117 X |
| 5,680,535 | * 10/1997 | Harbin et al. | 345/117 X |
| 5,699,104 | * 12/1997 | Yoshinobu | 345/117 X |
| 5,726,909 | * 3/1998 | Krikorian | 345/177 X |
| 5,738,527 | * 4/1998 | Lundberg | 345/117 X |
| 5,740,549 | * 4/1998 | Reilly et al. | 345/117 X |
| 5,742,668 | * 4/1998 | Pepe et al. | 340/825.44 X |
| 5,819,284 | * 10/1998 | Farber et al. | 345/329 X |
| 5,827,071 | * 10/1998 | Sorensen et al. | 345/117 X |
| 5,838,252 | * 11/1998 | Kikinis | 340/825.44 |
| 5,850,220 | * 12/1998 | Motai | 345/339 |
| 5,852,436 | * 12/1998 | Franklin et al. | 345/326 |
| 5,905,492 | * 5/1999 | Straub et al. | 345/333 |
| 5,905,777 | * 5/1999 | Foladare et al. | 340/825.44 X |

OTHER PUBLICATIONS

Berkely Systems After Dark Screen Saver Print Out, Oct. 1996, p. 1.

* cited by examiner

Primary Examiner—Steven Sax (57) ABSTRACT

A wireless screen saver for use with an electronic information processing device (106) having a display screen (300). The wireless screen saver has a first screen layout with at least one predetermined display pattern (302) persisting until a user input is detected. Upon detection of the user input, a second screen layout is invoked, presenting at least a first virtual messaging device (410) for accepting and displaying a message for transmission to a real messaging device (118).

40 Claims, 6 Drawing Sheets

PRIOR ART

COMPUTER SCREEN SAVER WITH WIRELESS MESSAGING CAPABILITY AND METHOD THEREFOR

FIELD OF THE INVENTION

This invention relates in general to computer application software and systems and more particularly to a screen saving application program with wireless and protecting message capability.

BACKGROUND OF THE INVENTION

Computing systems, such as those used to enhance productivity in an office environment or facilitate conveniences in the home, all share a common problem. Typically, a display device of choice for desktop or countertop computing systems is the conventional cathode ray tube. It is well known that when an unchanging pattern is displayed on a cathode ray tube for extended periods of time, a phenomena called "burn-in" will occur. This damages the screen phosphors, resulting in a degradation of contrast and brightness in those areas of the cathode ray tube (CRT) subjected to the continuous display of an unchanging pattern. Similarly, display devices such as liquid crystal displays (either active or passive matrix) experience a similar degradation in performance when subjected to the continuous display of an unchanging pattern. Consequently, the idea of a "screen saver" was developed.

Screen savers can be classified in two primary groups. The first group comprises those screen savers that completely blank the display area by removing all signals from the display device, resulting in a blank display. A second group of screen savers operates by animating a continuously changing pattern on the screen or display device during that period in which the computer is idle, e.g., when a user walks away from their desk. Screen savers have also been used to implement rudimentary security, e.g., once the screen saver display begins or the CRT is blanked, interaction with the computer is prevented until a user successfully enters a password. After entry of the correct password, the screen saver is disabled the computer returns to normal operation. Additionally, the screen saver function may be invoked by either a user supplied command or a default or programmable system time-out.

Accordingly, computer screen saver programs effectively operate to extend the usable life of display devices associated with the computers. However, current state of the art computer screen saver programs have limited their utility to the "screen saving" function, and not beyond. Consequently, what is needed is a program and method that allows extension of the functionality associated with screen savers, particularly of the second group discussed above.

Some screen saver applications allow the user to enter a pre-programmed message that is animated on the screen during the screen savers operation. This feature is commonly used to display information regarding the user's whereabouts. However, an observer is still relegated to use conventional means, such as a telephone or selective call receiver (e.g., paging system), to contact the computer user. Because conventional screen savers disable operation of the computer until the correct password is entered, the observer viewing the screen saving display and information cannot use the computer running the screen saver for the entry of data, or initiation of electronic messaging. Thus, the observer must either pick up the phone, dial the users extension number, or dial their paging service, manually entering the user's "capcode" or paging identification number, and a corresponding message. Even once this has been done, there are no assurances that the individual trying to be reached can be reached, or will receive the message.

Accordingly, what is needed is a screen saving application that facilitates the limited use of an operating computer for the purpose of entering a secured message and possibly delivering that or another message to the computer user via a wireless connection.

DESCRIPTION OF A PREFERRED EMBODIMENT

Figure 1:
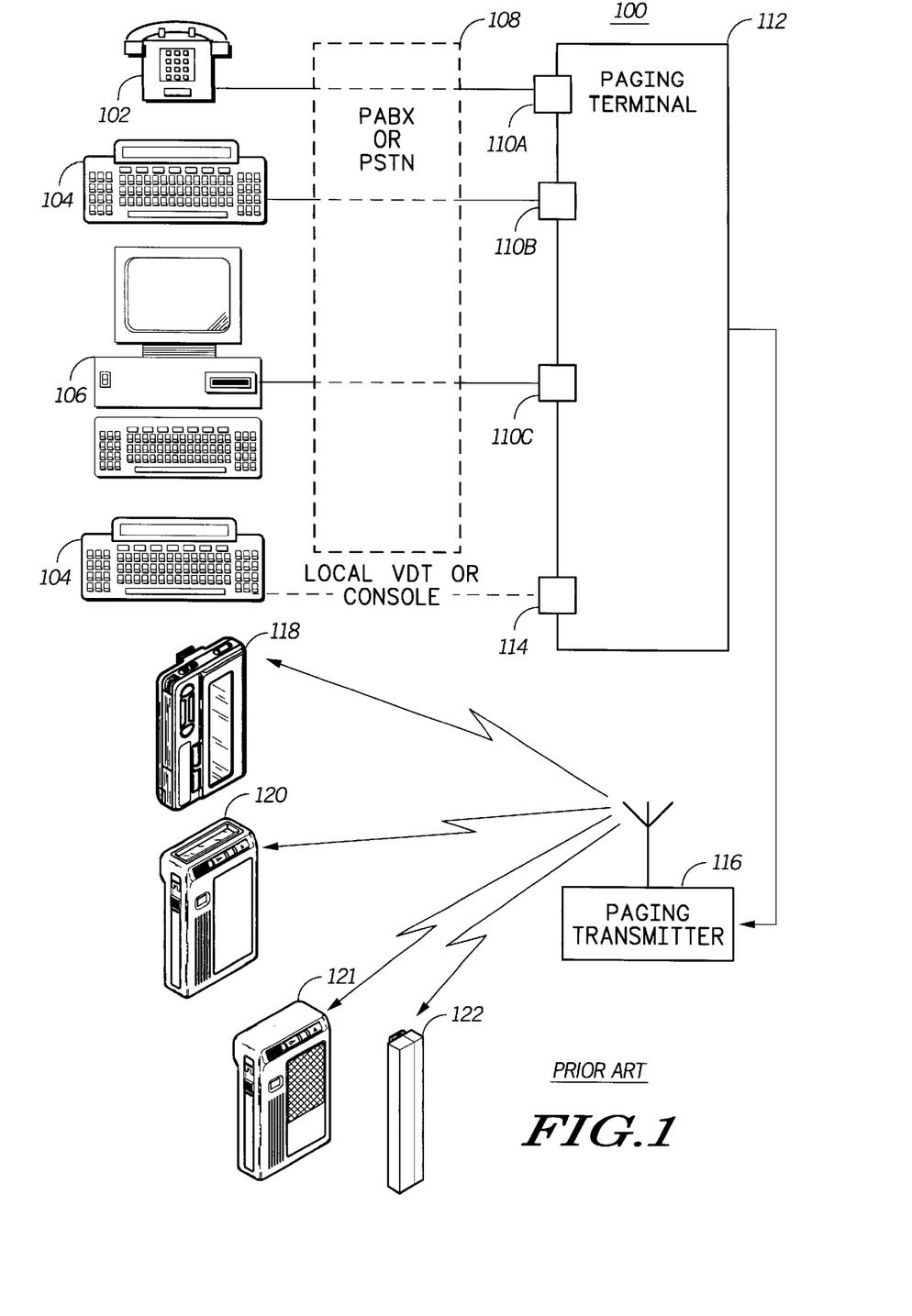
FIG. 1 is a block diagram of a conventional selective call communication system configured for operation in accordance with the present invention.

Referring to FIG. 1, a communication system (e.g., a paging system 100), accepts a page request from several different sources (e.g. a telephone 102, a page entry device 104, and a computer with a modem) 106. The page request is normally accepted through a public or private telephone network 108, which couples the page request from one of the sources (i.e., callers) to an automatic telephone input (110a, 110b, or 110c) at a paging terminal 112. Optionally, a dedicated input 114 at the paging terminal 112 can accept a page request from a local video display terminal or console. The dedicated input 114 is usually associated with a telephone switchboard and message dispatch service that accepts the page request from a telephone caller and enters the page request into the paging terminal 112 typically via the video display terminal.

After accepting the page request, the paging terminal 112 encodes and transmits, via a conventional transmitter 116, a page to a selective call receiver (e.g., a pager). Conventional paging systems may convey information from a caller to pager user via a plurality of message formats. These message formats are commonly referred to as message sources, each of which denotes a mode of data (e.g., characters, numbers, audio, graphics, or "just a beep") being sent to the pager. FIG. 1 illustrates a number of conventional selective call receivers that may receive information via either an alphanumeric display message page 118, a numeric display message page 120, a voice message page, 121 or a tone only page 122. In the later case, the tone only page 122 (i.e., no message page), alerts (e.g., an audible beep), the user that a caller wants the pager user to respond by calling a prearranged telephone number, such as a receptionist telephone number.

A conventional selective call receiver commonly receives a page, alerts the pager user, and optionally presents the message information according to a message format that is mapped to a pager address on the paging system. The unique pager address typically represents the message format (e.g., alphanumeric, numeric, voice, or tone only), supported by the selective call receiver. Therefore, by matching the unique pager address with the appropriately formatted message, a page with a specific message format may be effectively transmitted to the selective call receiver by the paging terminal 112.

Modern selective call receivers may be capable of receiving and presenting message information in a plurality of formats, typically using separate pager addresses mapped to the same selective call receiver. When more than one format is supported by a selective call receiver, there may be several unique sources (paging addresses) associated with the receiver that will allow correct reception of a different message format. For example, one pager address may be mapped to a numeric display message format and a second pager address may be mapped to a voice message format. Therefore, information may be conveyed from a caller to the pager user in either numeric display message format or voice message format.

Hence, the aforementioned communication system 100 is capable of receiving message information in a plurality of formats. The message formats are mapped to unique pager addresses supported by the communication system. Where more than one pager address and message format pairs are mapped to the same selective call receiver, information may be conveyed from a caller to a pager user in a plurality of message formats as discussed above.

Figure 2:
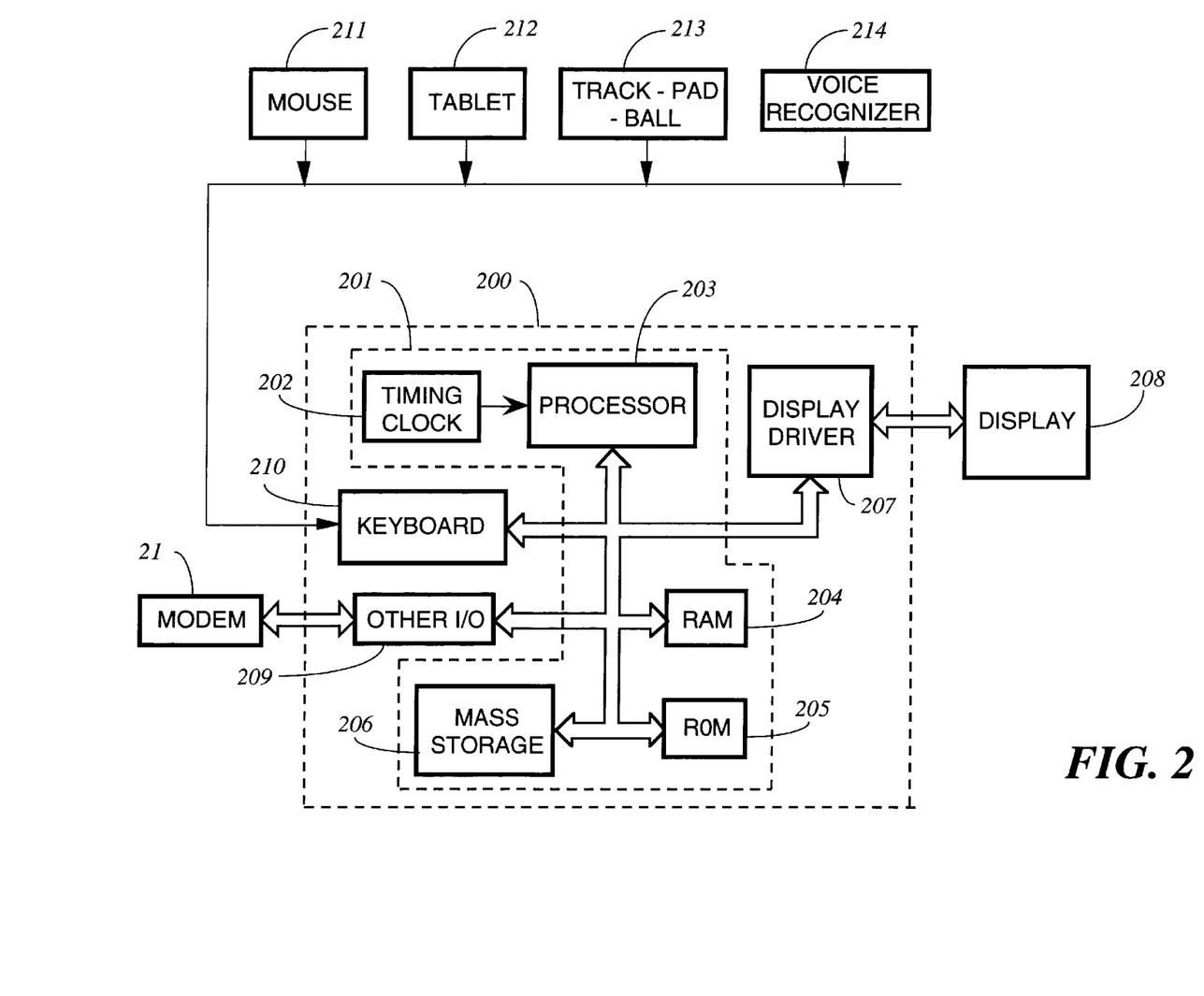
FIG. 2 illustrates an electronic information processing device or computer configured for operation in accordance with the preferred embodiment of the present invention.

Referring to FIG. 2, the illustration shows an electronic information processing device 200 or computer, configured for operation in accordance with the preferred embodiment of the present invention. The computer 300 may encompass any number of devices such as a dedicated pocket paging assistant, a personal computer, an electronic pocket organizer, a laptop computer, a personal digital assistant, or the like. As illustrated, the electronic information processing device 200 or computer minimally comprises a microcontroller 201 with a system timing clock 202, central processing unit 203, electronic memory in the form of random access memory (RAM) 204, read only memory (ROM) 205, mass storage (e.g., a disk drive or the like) 206, a display driver 207, general I/O interface or data port 208, and an interface 209 that accommodates any number of input means for general information entry. In the preferred embodiment, the computers information input means 209 (e.g. a keyboard, a mouse, a pen or puck activated tablet, a track ball, an audio activated command processor, or the like) allows a user to enter and manipulate information. After information is entered, it may be communicated to the paging terminal 112 via a conventional modem 210 or the like. The system formed by the elements depicted in FIGS. 1 and 2 realizes many advantages over the prior art selective call messaging systems and screen saver systems. The electronic information processing device or computer 200 can be commanded to automatically send either user entered or pre-stored messages to a selective call messaging subscriber defined in the screen saving application. Since the computer 200 includes both message storage and transmission capability, the system essentially functions as a real time or deferred reminder system. For instance, this system would eliminate the problem of being away from a fixed location such as your office, and not having your associates know your whereabouts or having the ability to reach you.

Additionally, the "wireless screen saver" serves as a first line of defense to secure proprietary or confidential data stored on your computer during your absence. As can be expected, once the registered user deactivates the wireless screen saver by the input of a correct code or password, the computer may resume normal operation.

Figure 3:
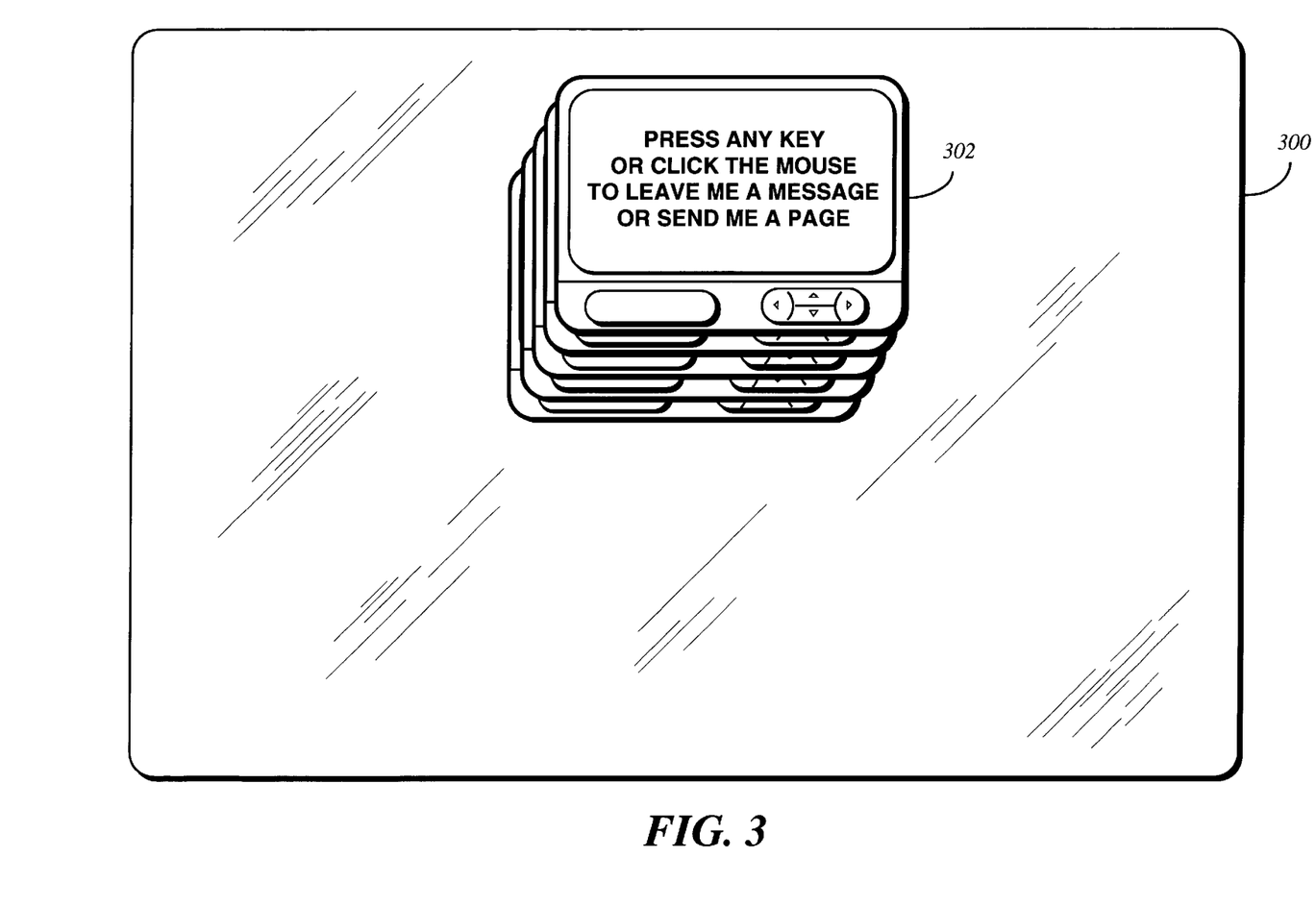
FIG. 3 illustrates a typical screen layout associated with a first mode of operation of the wireless screen saver.

Referring to FIG. 3, the illustration shows a typical screen layout associated with a first mode of operation of the wireless screen saver.

In this mode, the screen 300 is "locked," that is, at least one predetermined display pattern is presented and access to the standard functions associated with the user interface (e.g., the MacOS™ Finder, a trademark of Apple Computer, Inc., or Microsoft Windows™, a trademark of Microsoft Corporation, Inc.) is not available until an appropriate password is entered and accepted. However, a user may access the second mode and layout as discussed in reference to FIG. 4. In this example, the at least one predetermined display pattern comprises a virtual messaging device, e.g., a mock pager, including a notification message selectable by an authorized user of the wireless screen saver. Preferably, the at least one predetermined display pattern (mock pager) 302 is animated about the screen 300 with the notification message, such as "PRESS ANY KEY OR CLICK THE MOUSE TO LEAVE ME A MESSAGE OR SEND ME A PAGE." This notifies a potential user that the wireless screen saver is operational and ready for use. As stated earlier, it is well known that when an unchanging pattern is displayed on a cathode ray tube or a liquid crystal display for extended periods of time, a phenomena called "burn-in" will occur. This damages the screen phosphors or picture elements, resulting in a degradation of contrast and brightness in those areas of the cathode ray tube (CRT) subjected to the continuous display of an unchanging pattern. In the instant invention, the virtual messaging device is preferably animated about the display screen in a pseudo-random pattern that minimizes burn-in of display elements associated with the display screen. Thus, the screen performance is preserved, thus extending the useful life of the display device.

Figure 4:
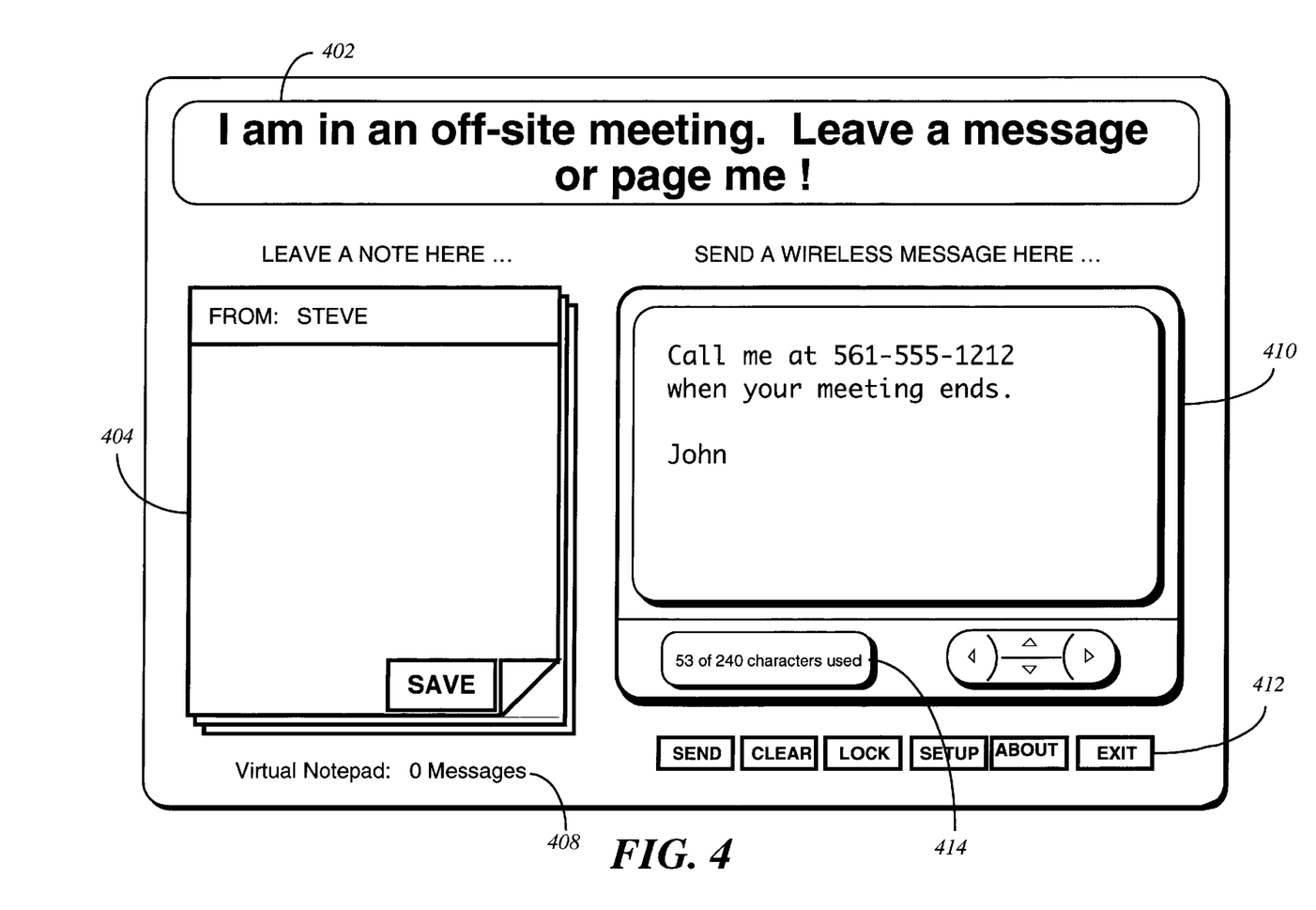
FIG. 4 illustrates a typical screen configuration associated with a second mode of operation of the wireless screen saver in accordance with the preferred embodiment of the present invention.

Referring to FIG. 4, the illustration a typical screen configuration associated with a second mode of operation of the wireless screen saver, in accordance with the preferred embodiment of the present invention.

In this second mode, the screen 300 is annotated with appropriate messaging and notification functions. The layout comprises a personalized message annunciation area 402 in which the system's owner may choose to display a message regarding their availability, location, or the like. A virtual notepad 404 is presented for a user to enter and save 406 a note intended for the system's owner. After entry of a note, a note saved field 408 that notifies the system's owner that a note or notes have been saved for later retrieval.

On the other side of the layout, a virtual messaging device (e.g., pager or the like) 410 is presented in which a user may enter a numeric or alphanumeric message for transmission to the system owner's pager, or possibly one or more other designated pagers. The a virtual messaging device or pager 410, as will be more fully discussed in reference to FIG. 5, is capable of accepting and displaying a message for transmission to a real messaging device such as a conventional selective call receiver 118, 120, 121, 122 or some other wireless communication device, via a system such as discussed in reference to FIG. 1.

The virtual pager 410 also may include a message status field 414, that displays a message length indication responsive to the configuration of the system owner's pager, the system owner's paging service, or the like, such that the message sent will be correctly formatted, transmitted, and received by the designated pager. Additionally, the message status field 414 is used to display the number of wireless messages (e.g., pages) sent when an authorized user reviews messages that were sent from the wireless screen saver.

Lastly, the second layout contains several context sensitive function buttons that allow either a casual user (e.g., one without password access to the computer) or an authorized user (e.g., the system's owner) to execute function such as to "send" a wireless message (page), "clear" a previously entered message (if an error was made), "lock" the screen, "setup" preferences associated with the wireless screen saver (e.g., timeout, paging service provider, destination(s) such as the system owner's pager, or possibly one or more other designated pagers), "about" which provides information such as the copyright and source of origin of the wireless screen saver program, and "exit" which aborts the entry process, returning to the display shown in FIG. 3.

Figure 5:
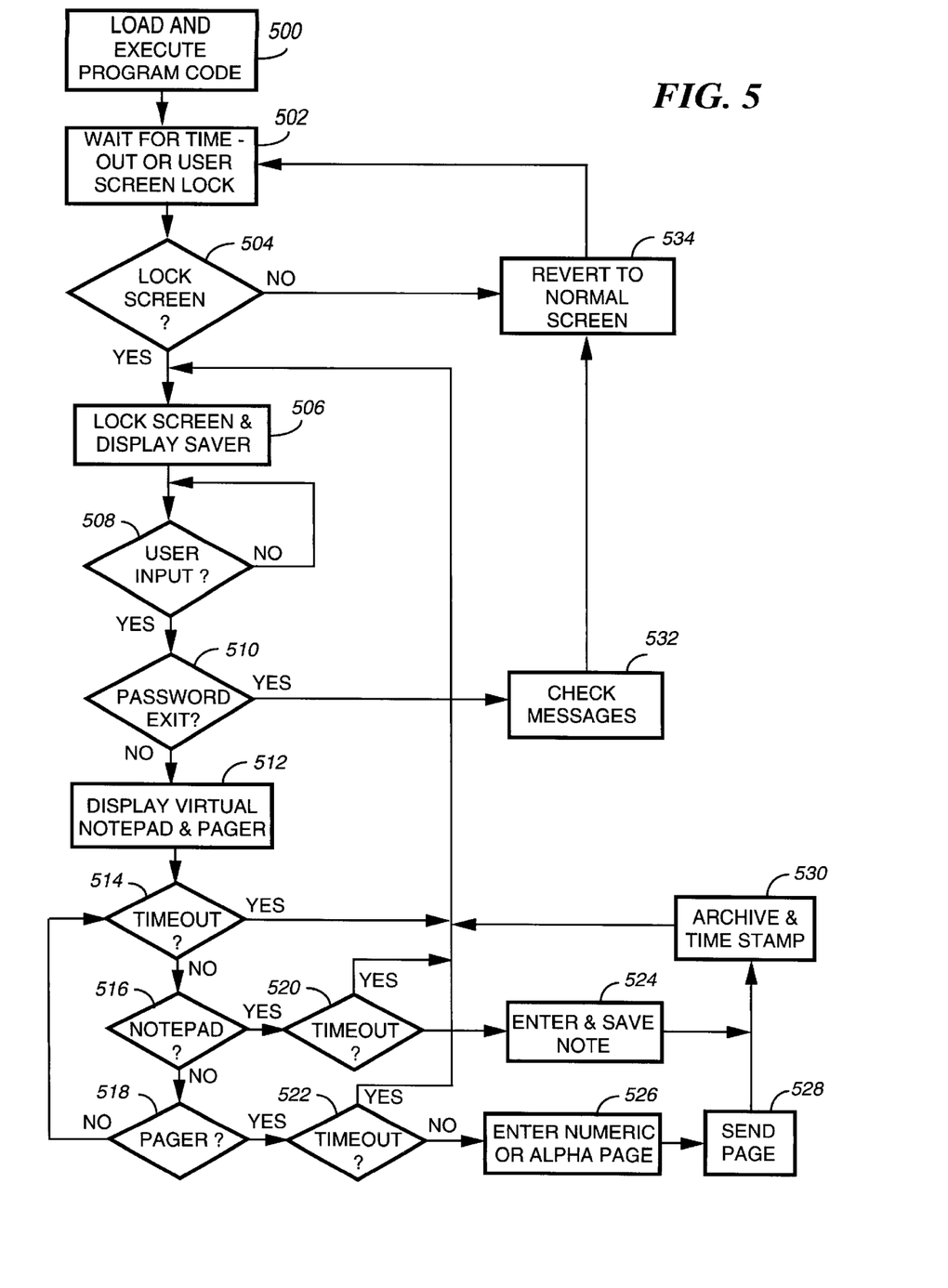
FIG. 5 is an exemplary flow diagram illustrating a preferred method of operation for the wireless screen saver embodied in the electronic information processing device or computer in accordance with the preferred embodiment of the present invention.

Referring to FIG. 5, the illustration shows an exemplary flow diagram of a preferred method of operation for the wireless screen saver embodied in the electronic information processing device or computer in accordance with the preferred embodiment of the present invention.

In step 500, the wireless screen saver program is loaded and executed. Upon loading and execution, the process may wait for a default timeout and lock the screen (this function is inherent) or accept a user input to lock the screen 502. When a user input requesting screen lock or the timeout occurs 504, the wireless screen saver locks the screen and displays the wireless screen saver as shown in FIG. 3, step 506.

In this first mode, the wireless screen saver will present (e.g., animate in this case) a virtual device image, such as a pager, until further user input is detected 508, e.g., a mouse click or movement, a keyboard input, a trackball movement, or possibly a voice command. One of ordinary skill in the art will readily recognize that these events are only a few that may occur when entering data into an electronic information processing device 200 or computer. Accordingly, this invention can be easily adapted to accommodate advances in the art such as capacitive, inductive, or resistive touch sensitive input devices (e.g., touch sensitive screens, or ancillary input devices like a "track-pad").

Upon detecting a user input, the wireless screen saver checks for a password 510 which may be entered transparently before display of the virtual notepad 404 and pager 410. If a password was entered and matched an authorized password (e.g., the systems owner's or other authorized user), the user will be given an opportunity to review messages saved or pages sent 532, in accordance with the procedure shown in FIG. 6. After step 532, the wireless screen saver will revert to a normal display screen, e.g., access to the standard functions associated with the user interface are resumed.

If no password was entered in step 510, the wireless screen saver displays of the virtual notepad 404 and virtual pager 410. The user then must take action within a timeout period 514 (either by default or as selected by the system's owner), or the wireless screen saver will automatically return to the locked state 506. If the user selects the virtual notepad 404 (step 516), again, the user then must take action within a timeout period 520, else the wireless screen saver will automatically return to the locked state 506. Similarly, If the user selects the virtual pager 410 (step 518), the user then must take action within a timeout period 522, otherwise the wireless screen saver will automatically return to the locked state 506.

When the user has selected the virtual notepad 404 (step 516), the user has the opportunity to enter and save a note 524. Alternatively, when the user has selected the virtual pager 410 (step 518), the user has the opportunity to enter a numeric or alphanumeric message 526 and send the message as a page 528. Upon completion of either step 524 or step 528, the note saved or a copy of the message sent is archived (or stored) along with a time stamp 530 for later perusal by an authorized user. The time stamp either indicates when a note was saved or a message was sent. Subsequently, the wireless screen saver again locks the screen 506 and waits for further user input.

Figure 6:
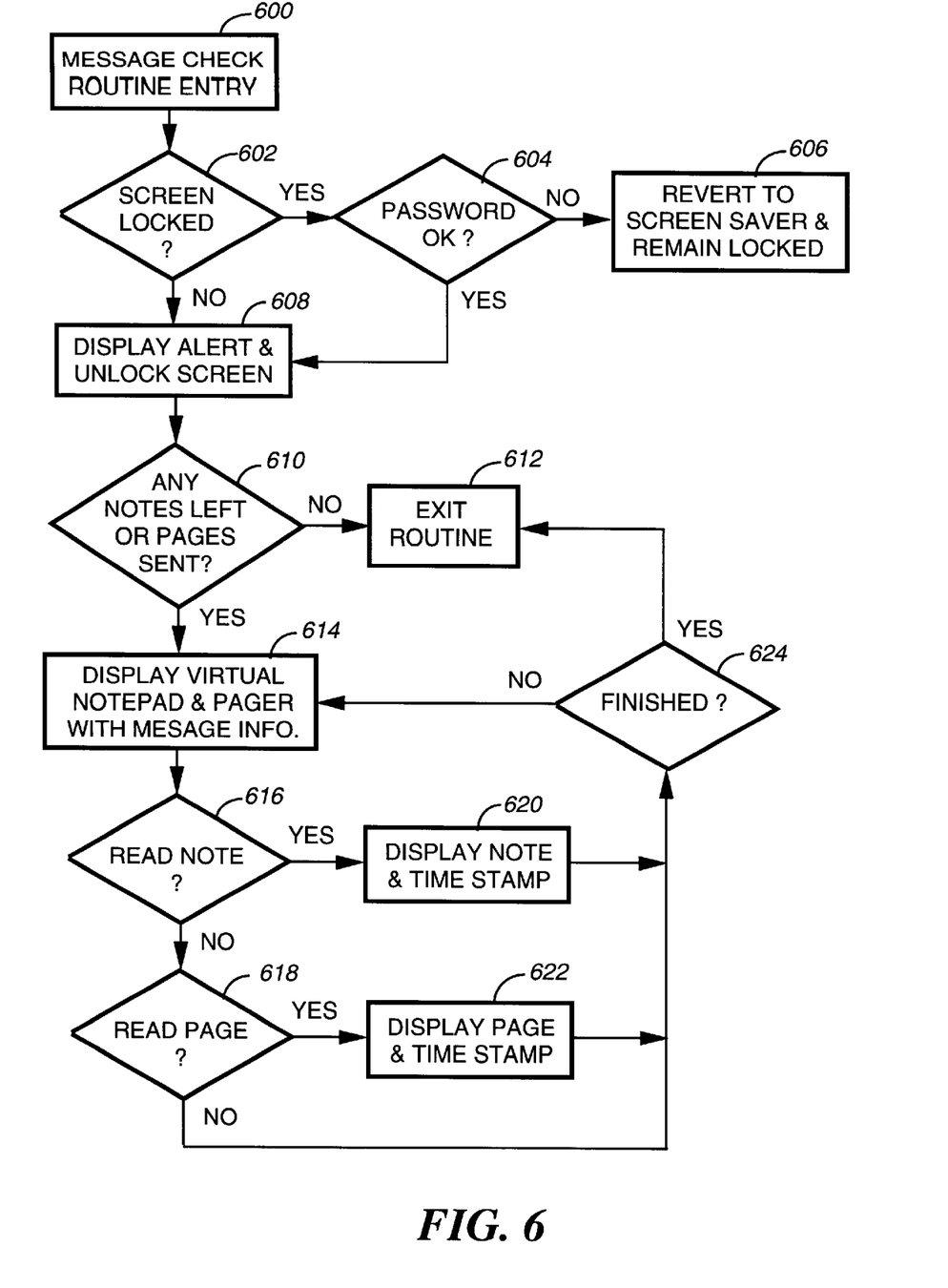
FIG. 6 is an exemplary flow diagram further illustrating a preferred method of operation for the wireless screen saver embodied in the electronic information processing device or computer in accordance with the preferred embodiment of the present invention.

Referring to FIG. 6, the illustration shows an exemplary flow diagram of a preferred method of operation for the wireless screen saver embodied in the electronic information processing device or computer in accordance with the preferred embodiment of the present invention.

FIG. 6 primarily represents the procedure embodied in step 532 of FIG. 5. Accordingly, when the message check routine is invoked 600, step 602 confirms that the screen was locked, and if locked, the entered password is tested for an exact match 604. If the password is incorrect, the wireless screen saver reverts to displaying the animated device (FIG. 3) and remains locked 606, returning to step 508 in FIG. 5. Alternatively, the routine illustrated in FIG. 6 may be used outside of the first and second modes (e.g., the locked, animated mode in FIG. 3 or message entry screen shown during the locked mode in FIG. 4), as a note/message review function possibly implemented in a stand-alone application, separate from the actual wireless screen saver application or module. This allows an authorized user to review the information stored and sent off-line, for further archival, printing, translation, or the like. Accordingly, if the routine illustrated in FIG. 6 is used outside of the wireless screen saver, step 606 would operate only to deny access to an unauthorized user, thus protecting the information.

If the password checked in step 604 matched an authorized password, the wireless screen saver displays an alert if messages have been saved or pages have been sent, and unlocks the screen 608. If no messages were saved or pages sent, step 610 fails, preferably notifying the user that no notes were saved or pages sent, and the routine exits 612. However, if messages were saved or pages sent, the virtual notepad 404 and virtual pager 410 are displayed 614, along with an accounting of notes (displayed in the note saved indicator 408) and the number of pages sent (displayed in the message status field 414). This alternate display give a user easy access to those functions (e.g., reading notes or pages) that were used. Moreover, when the second screen layout is presented following entry of an authorized password, the authorized user is allowed to review saved notes and stored messages, select, configure, and execute restricted options and preferences such as "setup" preferences associated with the wireless screen saver (e.g., timeout, paging service provider, destination(s) such as the system owner's pager, or possibly one or more other designated pagers).

If a note was saved, the user can display the note 616, and a time stamp indicating when the note was saved 620. The user can then dispose of that note (e.g., further archive or save as text, print, etc.) as needed. Similarly, is a page was sent, the user can display the page 616, and a time stamp indicating when the note was saved 622. The user can then dispose of that page (e.g., further archive or save as text, print, etc.) as needed. In each case, a user can display further notes or pages, or exit the routine when finished 624.

As may be discerned by one of ordinary skill in the art, minor variations from the disclosed invention are possible that would allow one to achieve the same end using a different means. Examples of such variations would be segmenting portion of the wireless screen saver into modular programs or "plug-ins" that would enhance a master wireless screen saver program. Similarly, the complete wireless screen saver could be implemented as a stand-alone application program, without any loss in functionality. Moreover, the procedural techniques illustrated are exemplary in nature and should in no way be taken to preclude the inclusion of techniques such as structured or object oriented programming methods, a hardware assisted implementation, or the like.

We claim:

1. A wireless screen saver for use with an electronic information processing device having a display screen, the wireless screen saver comprising:

a first screen layout comprising at least one predetermined display pattern, the first screen layout persisting until a user input is detected, the at least one predetermined display pattern including a second virtual messaging device, the second virtual messaging device including a notification message selectable by an authorized user of the wireless screen saver, the notification message operating to notify a user that the wireless screen saver is operational and ready for use; and a second screen layout invoked upon detection of the user input, the second screen layout including at least a first virtual messaging device for accepting and displaying a message for transmission to a real messaging device, and including a personalized message annunciation area containing the notification message.

2. The wireless screen saver according to claim 1, wherein the at least one predetermined display pattern comprises:

a second virtual messaging device.

3. The wireless screen saver according to claim 2, wherein the second virtual messaging device comprises:

a notification message selectable by an authorized user of the wireless screen saver, the notification message operating to notify a user that the wireless screen saver is operational and ready for use.

4. The wireless saver according to claim 3 wherein the second screen layout comprises:

a personalized message annunciation area containing the notification message.

5. A wireless screen saver for use with an electronic information processing device having a display screen, the wireless screen saver comprising:

a first screen layout comprising at least one predetermined display pattern, the first screen layout persisting until a user input is detected; and a second screen layout invoked upon detection of the user input, the second screen layout comprising at least a first virtual messaging device for accepting and displaying a message for transmission to a real messaging device, wherein the second screen layout comprises:

a set of context sensitive buttons corresponding with functions of the wireless screen saver, the functions comprising:

send, that sends a wireless message;

clear, that clears a previously entered message;

lock, that locks the display screen;

setup, that selects preferences associated with the wireless screen saver, the preferences comprising a screen lock timeout, a messaging service provider, and a messaging device destination;

about, that provides information such as on patents, copyright, and a source of origin of a wireless screen saver program; and exit, that aborts an entry process, returning to the first screen layout.

6. The wireless screen saver according to claim 5, wherein the first virtual messaging device further comprises:

a message status field.

7. The wireless screen saver according to claim 6, wherein the message status field operates to display a message length indication responsive to a configuration of an authorized user's messaging device and an authorized user's messaging service.

8. The wireless screen saver according to claim 6, wherein the message status field operates to display a number of wireless messages sent when an authorized user reviews messages sent using the wireless screen saver.

9. The wireless screen saver according to claim 5, wherein the first virtual messaging device operates to send the message to the real messaging device and store a copy of the message.

10. The wireless screen saver according to claim 9, wherein upon being stored, the copy of the message comprises:

the message; and a time-stamp associated with a date and time at which the message was sent.

11. The wireless screen saver according to claim 5, wherein the second screen layout further comprises:

a virtual notepad for entering and saving a note intended for later review by an authorized user of the wireless screen saver.

12. The wireless screen saver according to claim 11, wherein upon being saved, the note saved in the virtual notepad comprises:

the note; and a time-stamp associated with a date and time at which the note was saved.

13. The wireless screen saver according to claim 11, wherein the virtual notepad further comprises:

a note saved field that notifies an authorized user that at least one note was saved for retrieval.

14. The wireless screen saver according to claim 4, wherein the first virtual messaging device further comprises:

a message status field.

15. The wireless screen saver according to claim 14, wherein the message status field operates to display a message length indication responsive to a configuration of an authorized user's messaging device and an authorized user's messaging service.

16. The wireless screen saver according to claim 14, wherein the message status field operates to display a number of wireless messages sent when an authorized user reviews messages sent using the wireless screen saver.

17. The wireless screen saver according to claim 1, wherein the first virtual messaging device operates to send the message to the real messaging device and store a copy of the message.

18. The wireless screen saver according to claim 17, wherein upon being stored, the copy of the message comprises:

the message; and a time-stamp associated with a date and time at which the message was sent.

19. The wireless screen saver according to claim 1, wherein the second screen layout further comprises:

a virtual notepad for entering and saving a note intended for later review by an authorized user of the wireless screen saver.

20. The wireless screen saver according to claim 19, wherein upon being saved, the note saved in the virtual notepad comprises:

the note; and a time-stamp associated with a date and time at which the note was saved.

21. The wireless screen saver according to claim 19, wherein the virtual notepad further comprises:

a note saved field that notifies an authorized user that at least one note was saved for retrieval.

22. In an electronic information processing device having a display screen, a method for implementing a wireless screen saver, comprising the steps of:

presenting a first screen layout comprising at least one predetermined display pattern, the first screen layout persisting until a user input is detected;

detecting the user input during presentation of the first screen layout;

presenting a second screen layout in response to detecting the user input, the second screen layout comprising at least a first virtual messaging device capable of accepting and displaying a message for transmission to a real messaging device; and presenting a notification message as part of the second screen layout, the notification message being selectable by an authorized user of the wireless screen saver and operating to notify a user that the wireless screen saver is ready for use, wherein the notification message is displayed in a personalized message annunciation area.

23. The method for implementing the wireless screen saver according to claim 22, wherein the step of presenting the first screen layout comprising at least one predetermined display pattern comprises the step of:

animating a second virtual messaging device about the display screen in a pseudo-random pattern that minimizes burn-in of display elements associated with the display screen.

24. The method for implementing the wireless screen saver according to claim 22, comprising the steps of:

presenting a set of context sensitive buttons corresponding with functions of the wireless screen saver as part of the second screen layout, the functions comprising:

send, that sends a wireless message;

clear, that clears a previously entered message;

lock, that locks the display screen;

setup, that selects preferences associated with the wireless screen saver, the preferences comprising:

a screen lock timeout, a messaging service provider, and a messaging device destination;

about, that provides information such as on patents, copyright, and a source of origin of a wireless screen saver program; and exit, that aborts an entry process, returning to the first screen layout.

25. The method for implementing the wireless screen saver according to claim 22, comprising the step of:

presenting a message status field in conjunction with the first virtual messaging device, the message status field operating to display a message length indication responsive to a configuration of an authorized user's messaging device and an authorized user's messaging service.

26. The method for implementing the wireless screen saver according to claim 25, wherein the message status field further operates to display a number of wireless messages sent when an authorized user reviews messages sent using the wireless screen saver.

27. The method for implementing the wireless screen saver according to claim 22, comprising the steps of:

sending the message to the real messaging device; and storing a copy of the message.

28. The method for implementing the wireless screen saver according to claim 27, wherein the storing step comprises the step of:

time-stamping the message with a date and time at which the message was sent to create the copy of message comprising the message and a time-stamp.

29. The method for implementing the wireless screen saver according to claim 22, comprising the step of:

presenting a virtual notepad as part of the second screen layout, the virtual notepad allowing a user to enter and save a note intended for later review by an authorized user of the wireless screen saver.

30. The method for implementing the wireless screen saver according to claim 29, comprising the step of:

presenting a note saved field in conjunction with the virtual notepad as part of the second screen layout, note saved field operating to notify an authorized user that at least one note was saved for retrieval.

31. The method for implementing the wireless screen saver according to claim 22, wherein the detecting step further comprises the steps of:

checking the user input during presentation of the first screen layout for a password;

unlocking the display screen in response to the password exactly matching an authorized password;

presenting the second screen layout and allowing an authorized user to review saved notes and stored messages, select, configure, and execute restricted options and preferences in response to the password exactly matching the authorized password;

locking the display screen in response to the password not matching the authorized password; and presenting the first screen layout until a subsequent user input is detected, in response to the password not matching the authorized password.

32. In an electronic information processing device having a display screen, a method for implementing a wireless screen saver, comprising the steps of:

presenting a first screen layout comprising at least one predetermined display pattern, the first screen layout persisting until a user input is detected;

detecting the user input during presentation of the first screen layout, wherein the detecting step further comprises the steps of:

checking the user input during presentation of the first screen layout for a password;

unlocking the display screen in response to the password exactly matching an authorized password;

presenting the second screen layout and allowing an authorized user to review saved notes and stored messages, select, configure, and execute restricted options and preferences in response to the password exactly matching the authorized password;

locking the display screen in response to the password not matching the authorized password; and presenting the first screen layout until a subsequent user input is detected, in response to the password not matching the authorized password and presenting a second screen layout in response to detecting the user input, the second screen layout comprising at least a first virtual messaging device capable of accepting and displaying a message for transmission to a real messaging device.

33. The method for implementing the wireless screen saver according to claim 32 wherein the step of presenting the first screen layout comprising at least one predetermined display pattern comprises the step of:

animating a second virtual messaging device about the display screen in a pseudo-random pattern that minimizes burn-in of display elements associated with the display screen.

34. The method for implementing the wireless screen saver according to claim 32, comprising the steps of:

presenting a set of context sensitive buttons corresponding with functions of the wireless screen saver as part of the second screen layout, the functions comprising:
send, that sends a wireless message;
clear, that clears a previously entered message;
lock, that locks the display screen;
setup, that selects preferences associated with the wireless screen saver, the preferences comprising:
a screen lock timeout,
a messaging service provider, and
a messaging device destination;
about, that provides information such as on patents, copyright, and a source of origin of a wireless screen saver program; and
exit, that aborts an entry process, returning to the first screen layout.

35. The method for implementing the wireless screen saver according to claim 32, comprising the step of:

presenting a message status field in conjunction with the first virtual messaging device, the message status field operating to display a message length indication responsive to a configuration of an authorized user's messaging device and an authorized user's messaging service.

36. The method for implementing the wireless screen saver according to claim 35, wherein the message status field further operates to display a number of wireless messages sent when an authorized user reviews messages sent using the wireless screen saver.

37. The method for implementing the wireless screen saver according to claim 32, comprising the steps of:

sending the message to the real messaging device; and
storing a copy of the message.

38. The method for implementing the wireless screen saver according to claim 37, wherein the storing step comprises the step of:

time-stamping the message with a date and time at which the message was sent to create the copy of message comprising the message and a time-stamp.

39. The method for implementing the wireless screen saver according to claim 32, comprising the step of:

presenting a virtual notepad as part of the second screen layout, the virtual notepad allowing a user to enter and save a note intended for later review by an authorized user of the wireless screen saver.

40. The method for implementing the wireless screen saver according to claim 39, comprising the step of:

presenting a note saved field in conjunction with the virtual notepad as part of the second screen layout, note saved field operating to notify an authorized user that at least one note was saved for retrieval.

* * * * *